United States Patent [19]

Herrmann

[11] Patent Number: 4,991,471
[45] Date of Patent: Feb. 12, 1991

[54] THREE-POINT-CONTACTING PLIERS FOR BREAKING GLASS

[76] Inventor: Heinz Herrmann, Leipzigerstrasse 105, D-4154 Tönisvorst 1, Fed. Rep. of Germany

[21] Appl. No.: 282,610

[22] Filed: Dec. 9, 1988

[30] Foreign Application Priority Data

Dec. 19, 1987 [DE] Fed. Rep. of Germany ... 8716749[U]

[51] Int. Cl.$^5$ .............................................. B25B 7/02
[52] U.S. Cl. ...................................... 81/426; 225/96.5
[58] Field of Search ..................... 81/426, 189, 418; 225/96.5, 93, 103

[56] References Cited

U.S. PATENT DOCUMENTS 1,316,409  9/1919  Bahre ................................. 81/426

FOREIGN PATENT DOCUMENTS 0565407 10/1958 Canada .............................. 225/96.5

Primary Examiner—Frederick R. Schmidt
Assistant Examiner—Lawrence Cruz
Attorney, Agent, or Firm—Herbert Dubno

[57] ABSTRACT

A three-point-contacting pliers for breaking glass along a prescored line has two opposing movable jaws. One jaw has a central projection. To provide an easy exact alignment of the three points of the closing jaws on the prescored line the other jaw, formed as an abutting member or anvil, is provided with a protruding flexible elastic circular ring which may be locked in a receptacle portion and which surrounds the central projection when the jaws are closed. To make alignment of the jaws on the prescored line even easier, the other jaw with the ring may be provided with a throughgoing hole coaxial with the ring which acts as a viewing window and which widens conically from the side of the jaw having the ring.

2 Claims, 2 Drawing Sheets

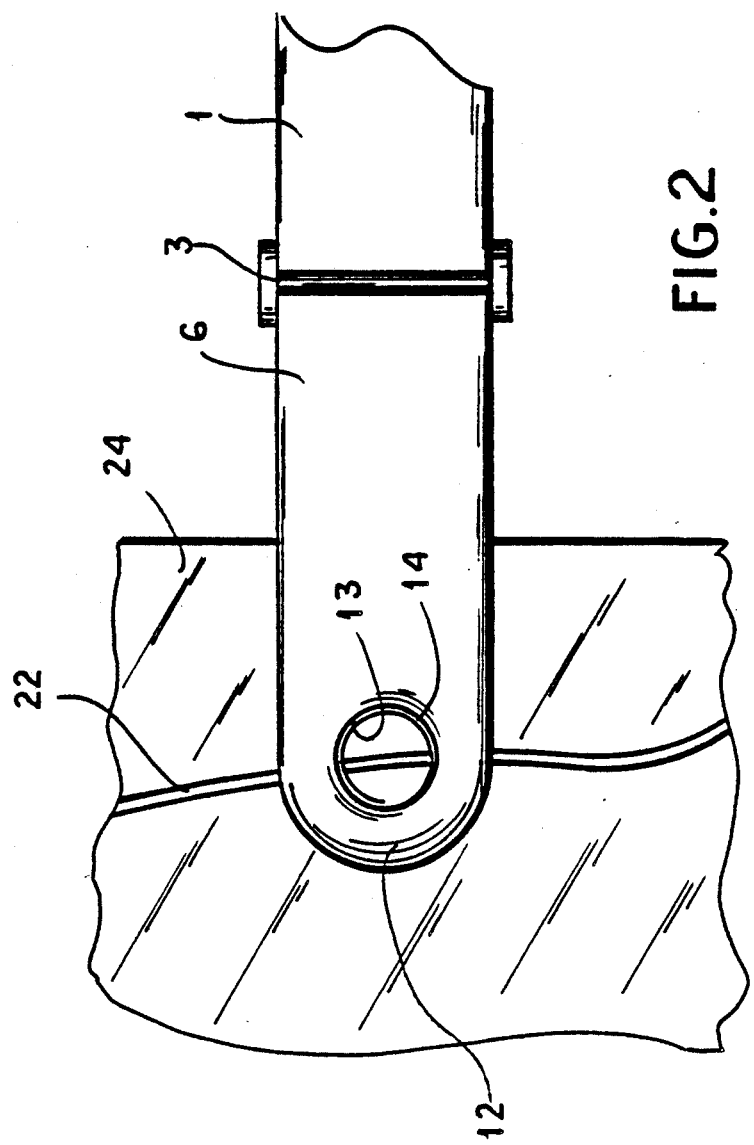

THREE-POINT-CONTACTING PLIERS FOR BREAKING GLASS

FIELD OF THE INVENTION

The present invention relates to a three-point-contacting pliers for breaking glass, i.e. to a glass-breaking pliers.

BACKGROUND OF THE INVENTION

The customary glass-breaking pliers for separating two pieces of glass along a prescored line comprises two opposing movable jaws. One of these jaws has a central projection and the other is formed as an abutting member. The jaw with the central projection is pressed on a prescored line on one side of a piece of glass to be broken and the other jaw is pressed on the other side of the prescored line to cause breakage of the glass piece along the scored line.

This type of pliers is necessary for producing glass pieces of specific shapes, especially when Tiffany-type lamps are being made. To make the break, the jaws must be applied so that the central projection is positioned on one side of a prescored line on the piece of glass and the two-point abutting member is positioned on the other side of this line. That presumes a very precise alignment of the jaws in regard to the prescored line. With glass pieces having a complex shape there are problems because a suitable alignment of the jaws is either very difficult or not possible. If the jaws are not correctly aligned, the break can leave the prescored line.

OBJECTS OF THE INVENTION

It is an object of my invention to provide an improved three-point-contacting pliers which makes correct breaking of a piece of glass easier.

It is another object of my invention to provide an improved three-point-contacting pliers which can be used to break a piece of glass along a prescored line more reliably than the currently used pliers.

SUMMARY OF THE INVENTION

These objects and others which will become more readily apparent hereinafter are attained in accordance with my invention in a three-point-contacting pliers for breaking glass in which the other jaw formed as the abutting member has a protruding flexible elastic ring which surrounds or embraces the central projection. This ring which is circular forms a two-point bearing member on 360° which is effective on pressing together both jaws.

Because the two contact points formed by the other jaw will tie on opposite sides of the score line regardless of the angle made by pliers with the score line, the elastic ring is highly advantageous. The two-point-bearing member comprises the entire ring which in every case automatically takes the correct angle on the prescored line and is effective. The ring is advantageously made of a soft plastic.

To retain the protruding ring in the other jaw it is sufficient that the ring be clamped (press-fitted) in a receptacle portion, i.e. a cavity or hole, of the other jaw. That has the advantage that the ring can be replaced without great difficulty when it becomes worn or damaged.

Advantageously, the jaw formed as the abutting member with the ring has a throughgoing hole substantially coaxial with the ring which serves as a viewing window. Appropriately this hole can be conically tapered, widening in a direction going from the side having the ring to the other side of the jaw. This viewing window can be used to determine if the jaw is placed centrally or off center on the prescored line. Thus the central projection on the opposing jaw is always visible in the viewing window through the glass.

BRIEF DESCRIPTION OF THE DRAWING

The above and other objects, features and advantages of my invention will become more readily apparent from the following description, reference being made to the accompanying highly diagrammatic drawing in which:

FIG. 2 is top plan view of the jaws of the three-point-contacting pliers of FIG. 1 acting on a piece of glass with a prescored line to break it.

SPECIFIC DESCRIPTION

Figure 1:
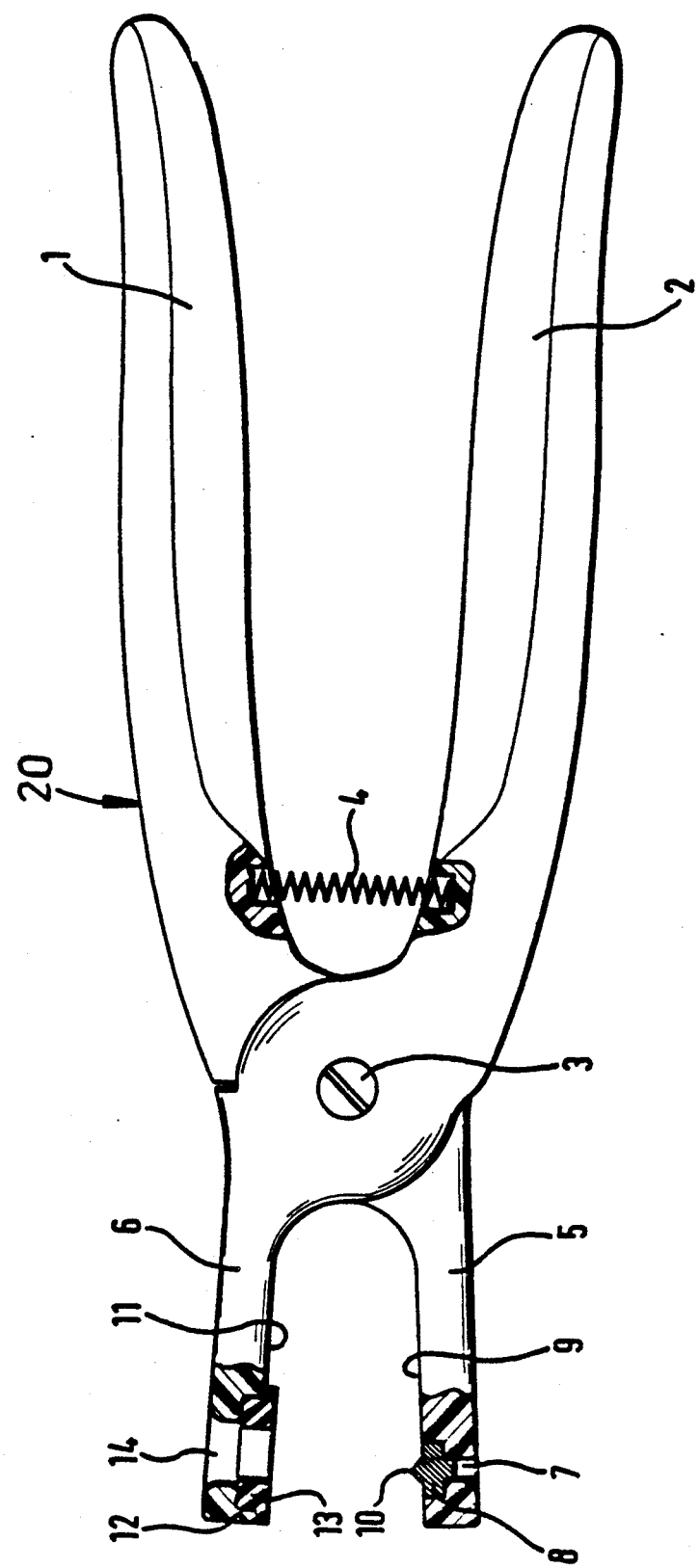
FIG. 1 is a side elevational view of a three-point-contacting pliers for breaking glass according to my invention.

The pliers shown in the drawing is a three-point-contacting pliers 20 which is designed to break glass 24 along a prescored line 22.

The pliers 20 has two plier members 1, 2 which can be pivoted relative to each other against the action of a spring 4 and held together by a pivot bearing 3.

Each plier member 1 and/or 2 has a jaw 5 and/or 6 on the other side of the pivot bearing 3. The jaw 5 has a throughgoing stepped passage 7 in the vicinity of its free end in whose larger part a peg 8 with a projection 10 protruding beyond the jaw surface 9 is inserted.

The other jaw 6 has a receptacle portion 12, i.e. with a hole in its jaw surface 11, in which a ring 13 is held clamped which protrudes beyond the jaw surface 11. The protruding ring 13 is composed of a flexible elastic plastic material.

Substantially coaxial with the ring 13, the jaw 6 has a throughgoing hole 14 which widens conically from the side having the receptacle portion 12 to the opposite side. The hole 14 forms a viewing window through which the projection 10 may be seen while the jaws of the pliers 20 are being pressed together.

The operation of the pliers 20 of the invention is as follows:

As shown in FIG. 2 by looking through the viewing window, i.e. the hole 14, one can ensure that the projection 10 rests on the prescored line 22 as the clamp jaws 5 and 6 are pressed together and that the ring 13 is also properly aligned on the prescored line 22. That simplifies the alignment of the pliers 20 during the glass breaking. The pliers is thus applied to the prescored line 22 on the piece of glass 24 at a chosen angle. On pressing together both pliers members 1,2 the flexible ring 13 forms a two-point bearing member which straddles the score line and cooperates with the projection 10 to break the glass along the prescored line 22.

I claim:

1. In a three-point-contacting pliers for breaking glass along a prescored line with two opposing movable jaws of which one of said jaws has a central projection and the other of said jaws is formed as an abutting member, the improvement wherein said other of said jaws formed as said abutting member has protruding therefrom a flexible circular elastic ring which surrounds said central projection and serves as main contact to said abutting member against said glass, said ring being held clamped in an associated receptacle portion of said other jaw, said other of said jaws being provided with a throughgoing hole substantially coaxial with said ring which acts as a viewing window.

2. A three-point-contacting pliers for breaking glass along a prescored line comprising:
two opposing movable jaws of which one of said jaws has a central projection and the other of said jaws is formed as an abutting member with a protruding flexible elastic circular ring which is held clamped in a receptacle portion of said other jaw and surrounds or embraces said central projection, said other jaw being provided with a throughgoing hole substantially coaxial with said ring which acts as a viewing window and which widens conically away from a side of said other of said jaws having said receptacle portion.

* * * * *